INVENTORS
IRWIN M. JACOBS
LEONARD KLEINROCK
WARREN A. LUSHBAUGH
WILLY TVEITAN
BY
ATTORNEYS

PRIOR ART

| n | CODEWORD BINARY BITS | CODEWORD OVERFLOW BITS | CODEWORD MARKER BITS | |
|---|---|---|---|---|
| 0 | 0 0 | | 0 | " 0 0 0 |
| 1 | 1 0 | | 0 | " 1 0 0 |
| 2 | 0 1 | | 0 | " 0 1 0 |
| 3 | 1 1 | | 0 | " 1 1 0 |
| 4 | 0 0 | 1 | 0 | " 0 0 1 0 |
| 5 | 1 0 | 1 | 0 | " 1 0 1 0 |
| 6 | 0 1 | 1 | 0 | " 0 1 1 0 |
| 7 | 1 1 | 1 | 0 | " 1 1 1 0 |
| 8 | 0 0 | 1 1 | 0 | " 0 0 1 1 0 |
| 9 ----- | 1 0 | 1 1 | 0 | " 1 0 1 1 0 |
| 1+(X·4) | 1 0 | X 1S | 0 | " 1 0 [X 1S] 0 |

INVENTORS
IRWIN M. JACOBS
LEONARD KLEINROCK
WARREN A. LUSHBAUGH
WILLY TVEITAN
BY
ATTORNEYS

INVENTORS
IRWIN M. JACOBS
LEONARD KLEINROCK
WARREN A. LUSHBAUGH
WILLY TVEITAN
BY
ATTORNEYS

INVENTORS
IRWIN M. JACOBS
LEONARD KLEINROCK
WARREN A. LUSHBAUGH
WILLY TVEITAN
BY
ATTORNEYS

United States Patent Office 3,422,403

Patented Jan. 14, 1969

3,422,403

DATA COMPRESSION SYSTEM

James E. Webb, Administrator of the National Aeronautics and Space Administration with respect to an invention of Irwin M. Jacobs, La Jolla, Leonard Kleinrock and Warren A. Lushbaugh, Los Angeles, and Willy Tveitan, Tujunga, Calif.

Filed Dec. 7, 1966, Ser. No. 599,975
U.S. Cl. 340—172.5 9 Claims
Int. Cl. G11b 13/00

The invention described herein was made in the performance of work under a NASA contract and is subject to the provisions of Section 305 of the National Aeronautics and Space Act of 1958, Public Law 85–568 (72 Stat. 435; 42 USC 2457).

A system for storing data for a histogram of N samples and K cells in $K-1$ codewords arranged in a sequence of binary bits. The location of each codeword in the sequence corresponds to a different cell, and the number represented by the codeword represents the cell's height. The codewords are chosen so that the total data is stored in a near optimum minimum number of storage elements or bits.

Generally, when information is desired about the distribution of the occurrence of events, or the results of experiments, an experimental distribution or histogram is produced or plotted. The histogram is basically a graph, wherein the number of events occurring during each of a large number of observation periods, is plotted against the number of periods during which the same number of events were observed. The events may be any phenomena which can be expressed numerically, such as for example, the number of particles received during a given period, the number of people entering a room, etc. Thus, the term event should be interpreted broadly.

In order to produce a meaningful histogram, the number of observation periods is generally quite large, and, if the maximum number of events which may occur during each period is similarly large, a large body of data must be recorded or stored from which the histogram is to be plotted.

If the available data storing system is not limited, the need for storing the large body of data is generally insignificant. However, if the available means for storing the data is of limited size, the requirement of storing a large body of data often raises problems, which can only be solved by compressing the data so that it fits within the storing limitation of the storing system. Yet, the compressed data is supposed to contain all the meaningful information, from which the desired histogram may be plotted.

Data compression is almost universally employed in a spacecraft in order to minimize the size of the storing means which must be installed aboard it. In a co-pending application, Ser. No. 466,875, filed June 24, 1965, now Patent Number 3,369,222, and assigned to the same assignee of the present invention, a data compression system is described in which all the data necessary for a histogram of N sampling periods, during each one of which up to K events were counted is storable in a sequence of $N+K$ storing elements or bits.

Though the system disclosed therein, produces a significant compression of data, as compared with conventional storing arrangements, it has been found that by employing different circuitry and compression techniques, further data compression may be realized.

It is therefore, a primary object of the present invention to provide a new data compression system.

Another object is to provide a new system for recording and storing the number of events occurring during each of a plurality of periods, so that the stored data may be conveniently used to plot a histogram, in which the number of periods during each one of which an equal in number of events occurred, is plotted as a separate cell.

A further object is to provide a new data compression system for storing data for a histogram in fewer bits than required by prior art arrangements.

Still a further object is to provide a new system for storing data useful for plotting a histogram in a near optimum (minimum) number of bits.

These and other objects of the invention are achieved by using binary prefix code theory to develop a codeword, the length and characteristics of which are a function of the maximum number of events to be counted during each period, and the total number of periods during which, events are to be counted. The codewords, each comprising of a plurality of bits are stored as a sequence of bits. The location of each codeword in the sequence is related to a particular number of events counted in any one of the periods. Thus, the first codeword in the sequence is related to a count of "0" events per-period, while the second codeword is related to a one (1) event counted per-period, etc.

At the end of the reading operation or observation the number represented by each codeword, represents the number of periods during each one of which the particular number of events represented by the word have been counted. Thus for example, the number of the first codeword represents the number of periods during each one of which "0" events were counted, while the number represented by the second codeword represents the number of periods during each one of which only a single event was counted. By choosing the codewords to be of near optimum length, the total body of data is storable in fewer bits then in prior art systems.

The novel features that are considered characteristic of this invention are set forth with particularly in the appended claims. The invention will best be understood from the following description when read in connection with the accompanying drawings, in which:

FIGURE 2($b$) is a diagram of a sequence of bits in which histogram data is stored in accordance with the present invention;

Figure 1:
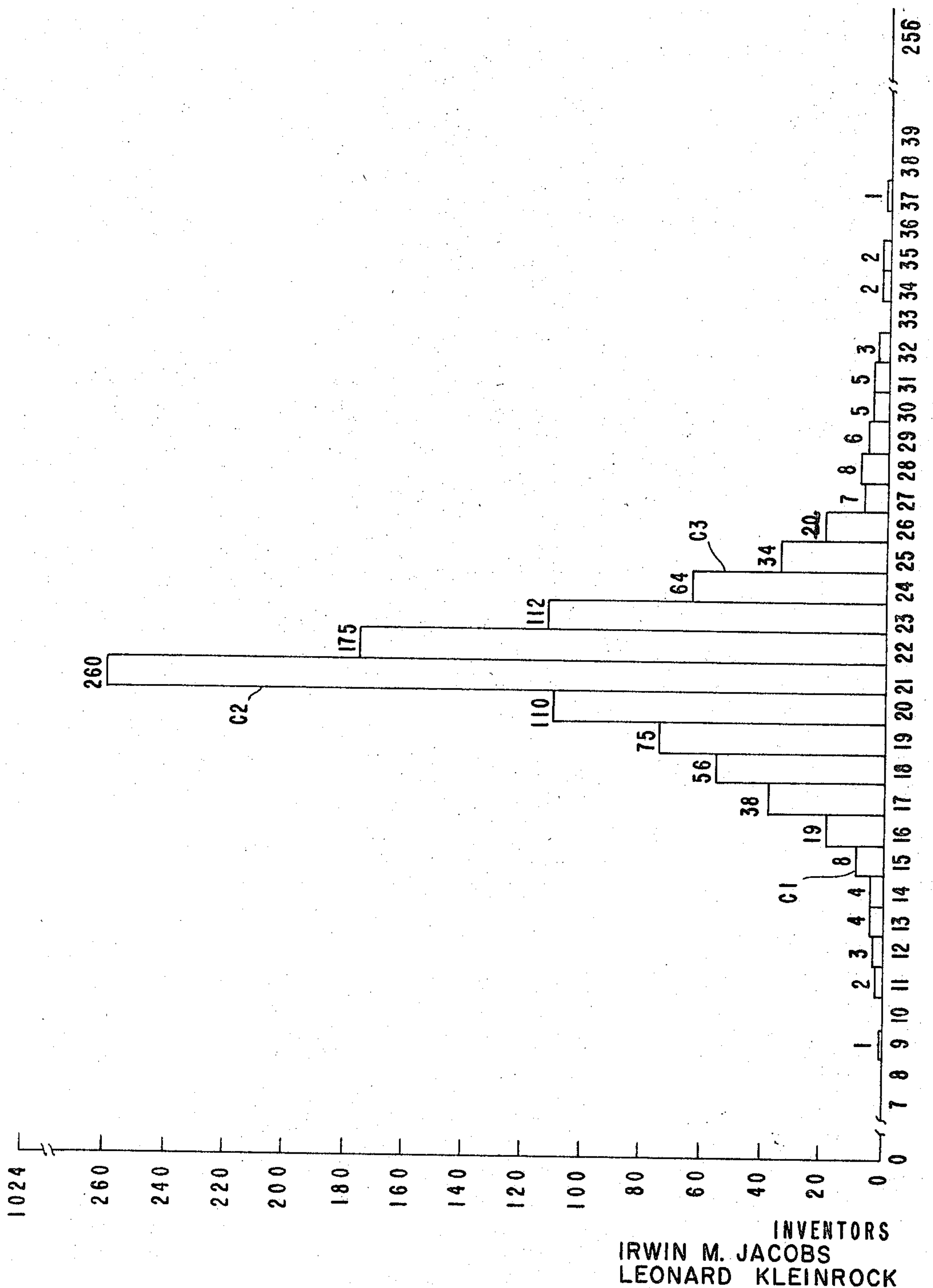
FIGURE 1 is a histogram of a distribution of events received during 1024 sampling periods.

The novel teachings of the present invention may better be explained in conjunction with a specific example. For explanatory purposes, it is assumed that the system is designed to observe and store the data necessary for plotting an N sample, K cell histogram, where N represents the number of periods of observation and K represents the maximum number of events such as particles which may be observed or received during any period. Let N be equal to 1024 periods, each one second long and let K be equal to 256. One example of a histogram of the experimental distribution of the received particles, is shown in FIGURE 1 to which reference is made herein. The abscissa represents the number of particles counted in each second, and the ordinate designates the number of periods or seconds during each one of which a certain number of particles were received. Thus, the histogram may be thought of as comprising of 257 cells (including a cell for 0 particles per-second). The height of each cell represents the number of periods during which a certain number of particles related to the particular cell were counted. Thus for example, the cells designated by C1, C2 and C3 represent that 15, 21 and 24 particles per-second were counted 8, 260 and 64 times, respectively.

It should be pointed out, that since the number N is known, it is only necessary to record and store the number of periods during which up to 255 particles were observed. Once this data is available, the number of periods during which 256 particles were observed can be computed.

It should be appreciated, that if conventional binary data recording techniques were used, an 8 bit word would be required to store the particles received in any given second, since the number of particles will not be more then 255. Since the sampling is taken over 1024 seconds, 1024 $\log_2 256$ or 8192 storage bits would be required. In such an arrangement, the time ordering of the data is maintained, since the actual number of particles observed in each period is stored in a separate 8 bit word.

If time ordering of the data is not significant, conventional techniques may be employed to store the data for an N sample, K cell, histogram, hereafter referred to as an N, K histogram, in $(K-1) \log_2 N$ storage bits. In the foregoing example, with $N=1024$, and $K-1=256$, a total of $256\times10=2560$ bits would be required.

Figures 2, 3:
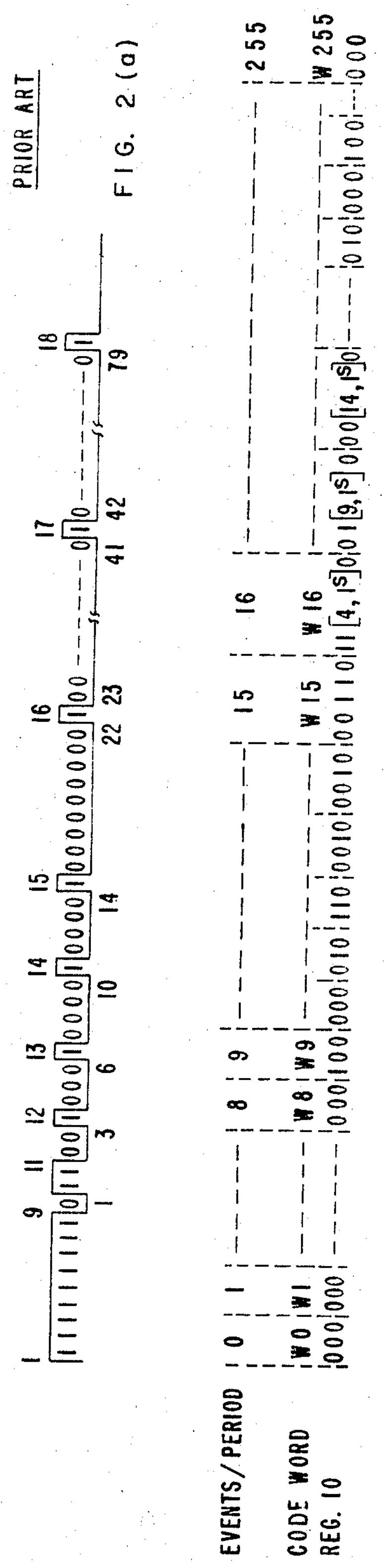
FIGURE 2($a$) is a diagram of a sequence of bits used to store data in accordance with a prior art system.
FIGURE 3 is a chart of a code derived in accordance with the teachings disclosed herein.

In the aforementioned co-pending application, a system is disclosed wherein the histogram data is compressed, so that only $N+(K-1)$ storage bits are required. Again assuming that N is 1024 and $K-1=256$, the total storage capacity required in the system is $1024+256=1280$. FIGURE 2($a$) to which reference is made herein, represents the states of the storage bits in the system disclosed in the co-pending application, after the counting of the number of events during each one of 1024 sampling periods.

Briefly, in the system of the co-pending application, a long shift register or delay line, 1280 bits long, is used as the storage means. Initially, the first 256 bits are in a first binary state such as "1," while the rest of the 1024 bits are in a second binary state or "0." At the end of the reading operation the "0's" are dispersed among the "1's" so that the number of "1's" proceeding each "0" bit represent the number of particles received during a sampling period represented by the "0" bit. For example, in FIGURE 2($a$) the "1's" represent counted events, and the "0's" sampling periods. Assuming that the bit on the extreme left-hand side is the first bit in the shift register, the first "0," following the first group of 9 bits in a "1" state or "1" bits, indicates that during one sampling period, 9 events were counted. Similarly, the two "0's" following the 11th bit is a "1" state, indicate that during each one of two sampling periods, 11 events were counted. Similarly, the three "0's" following the 12th bit in "1" state indicate that during each of three periods, 12 events were counted. These relationships are identical to those diagrammed in the histogram of FIGURE 1.

Again it should be pointed out that although the data compression system in the co-pending application results in an advance of the state of the art, a storage capacity of $N+K-1$ bits is required (in the example $$N+K-1=1280)$$

It should further be pointed out that such a system is only useful when $N+K-1$ is less than $(K-1) \log_2 N$.

In attempting to further compress the data required for the plotting of the histogram, it has been found that the data may be compressed by using codewords, arranged in a sequence of bits, in which the location of each codeword in the sequence is related to a particular number of events, counted during each period, while the numerical value or number, represented by the codeword, indicates the number of periods during each one of which the particular number of events were counted. Such an arrangement is represented in the example of FIGURE 2($b$), to which reference is made herein, In FIGURE 2($b$), in the third row the first bit on the left-hand side represents the first bit of a long shift register or delay line, used to store the data in accordance with the teachings of the present invention.

Briefly, in FIGURE 2($b$) the numbers on the top row represent the different number of events per-period, which may be counted, starting with 0 events per-period. Each one of the numbers in the row has a codeword W0 through W255 associated therewith, as shown in the second row of the figure. In the example, each codeword includes at least three bits, as seen from the third row.

In order to explain the reasons for selecing codewords so as to optimize, that is, minimize, the number of bits in which the histogram data may be stored, as well as, the particular code words used in the present invention, reference is first made to the following analysis in which the minimum storage requirement for an N, K histogram is discussed.

The minimum storage size required for (N, K) histogram is easily determined. The number of distinct histograms (partitious of N into K parts) is the binomial co-efficient $$\binom{N+K-1}{K-1}$$

By Stirling's approximation, the binomial co-efficient may be expressed as, $$\binom{N+K-1}{K-1} \approx \left(\frac{N+K-1}{2\pi(K-1)N}\right)^{1/2} \times\left(\frac{N}{1+K+1}\right)^{K-1}\left(\frac{K-1}{1+N}\right)^{N} \quad (1)$$

The minimum binary storage for L distinct items is $\log_2 L$ bits, which is achievable if a "code book" is used. Thus, the necessary and sufficient storage, say $S_{min.}$, is approximately, $$S_{min.} \approx S^*(K-1)\log_2\left(1+\frac{N}{K-1}\right) +N\log_2\left(1+\frac{K-1}{N}\right)+\frac{1}{2}\log_2\left(\frac{N+K-1}{2\pi(K-1)N}\right) \quad (2)$$

Assuming $N\gg K\gg 1$, the usual case, yields $$S^*\approx S^{**}=(K-1)\left(\log_2\left(\frac{N}{K-1}\right)+\log_2 e\right) -\tfrac{1}{2}\log_2(K-1) \quad (3)$$

$S^*$ and $S^{**}$ are first and second approximations. For example, $N=1024$, $K-1=256$, $S_{min.}=919$ $S^*=919$ $S^{**}=877$
$N=16,384$, $K-1=256$, $S_{min.}=1903$ $S^*=1903$ $S^{**}=1901$ If is thus seen, that the previously suggested methods fall significantly short of the optimum. Unfortunately, there does not appear to be any simple method, excluding code book lookup (which itself requires extremely large storage), for achieving the exact optimum.

A close approach to the optimum, however, is obtained by the use of prefix code theory, which is discussed by E. N. Gilbert in an article entitled, "Synchronization of Binary Messages," in the IRE Transactions of Information Theory, volume IT-6, pages 470–477, published in 1960.

These are codes with variable-length codewords. The prefix condition states that no codeword contains another codeword as its initial portion. As a result, the codewords are uniquely and instantaneously decipherable. A binary codeword, satisfying the prefix condition, is assigned to each number between 0 and N. The codewords, representing the contents of the K cells can then be placed one after the other, without the use of additional separators.

ticular number of events counted. Thus, at the end of all the sampling periods, each codeword represents the number of sampling periods during each one of which, a number of events equal to the events per period number with which the word is associated have been counted. Actually, for the histogram of FIGURE 1, the states of the various bits are as diagrammed in FIGURE 2(*b*). The first 9 codewords W0 through W8 each of three "0" bits indicate that during none of the periods were less than 8 events counted. However, the 10th codeword (W9) associated with 9 events per period represents the number 1, since during 1 period, 9 events were counted. The 14th codeword (W13), associated with 13 events per period represents the number 4 since during each of four periods, 13 events were counted.

It should again be pointed out that although the code words are of different lengths, they are easily decipherable by the use of the last marker bit which is always in a "0" state. That is, starting with the first code word, the first two bits are sensed, then the next "0" bit to be sensed, irrespective of any number of intervening "1" bits represents the end of the first code word.

Figure 4:
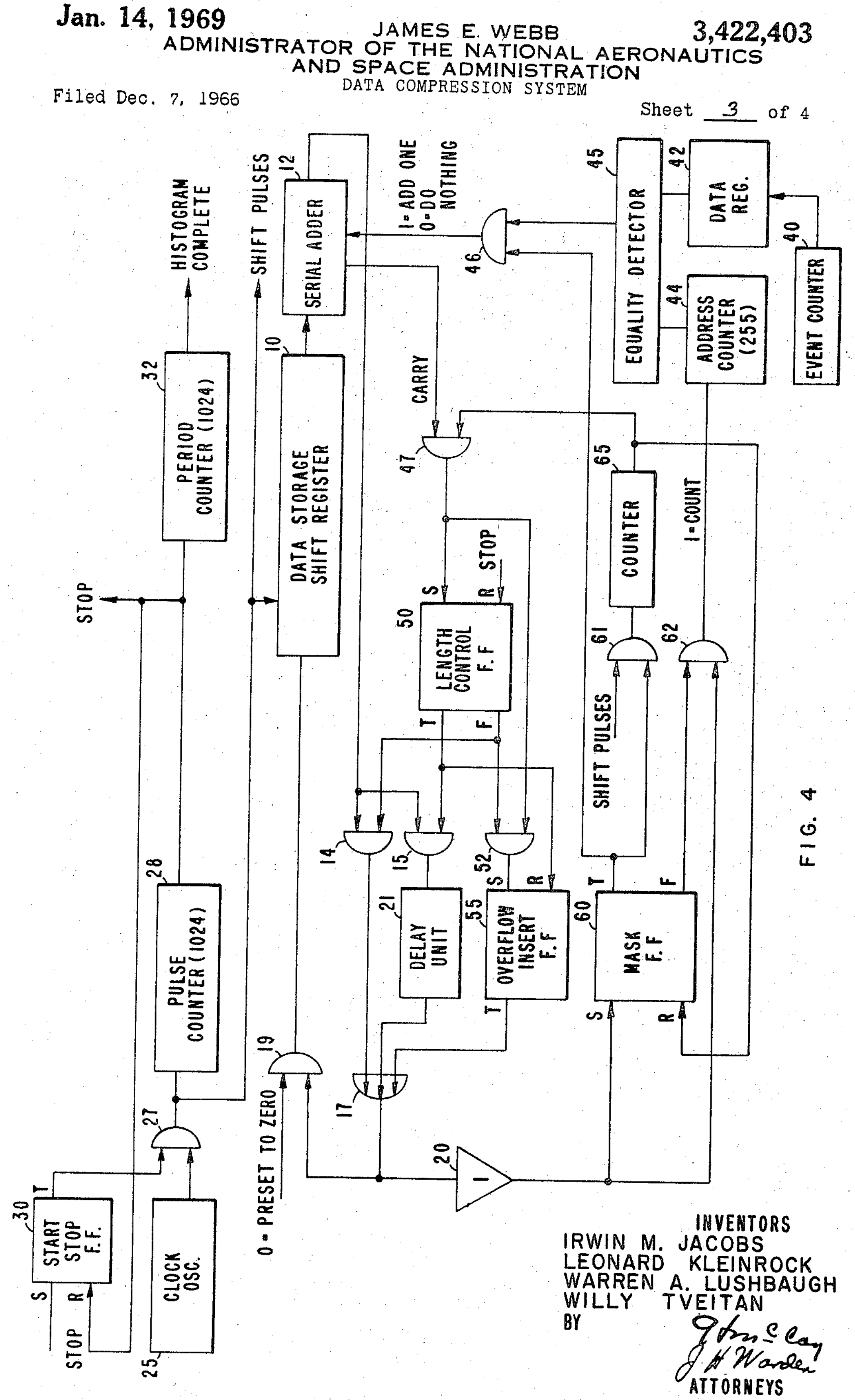
FIGURE 4 is a block diagram of one embodiment data compression system of the present invention.

A relatively simple data compression system for storing histogram data for the foregoing example is diagrammed in FIGURE 4 to which reference is made herein. The system is shown including a data storage shift register 10 having its output connected to a serial adder 12, the output of which is in turn connected to one input of each of AND gates 14 and 15. The output of AND gate 14 is connected to one input of an OR gate 17 whose output is connected to one input of an AND gate 19 and to the input of an inverter 20. The output of AND gate 15 is in turn connected to another input of OR gate 17 through a delay unit 21.

A master clock oscillator 25 is incorporated to provide shift or clock pulses which control the operation of the system as will be described hereafter in detail. The output clock pulses of oscillator 25 are supplied to one input of an AND gate 27 whose output is connected to a pulse counter 28, as well as to the shift register 10. The other input of AND gate 27 is connected to the true (T) output of a start-stop flip-flop 30, whose reset (R) input is connected to the output of counter 28. The set (S) input of flip-flop 30 is supplied with a "1" or true input at the start of each sampling period. The output of counter 28, in addition to being connected to the R input of 30, is also connected to the input of a period counter 32.

In addition, the system includes an event counter 40, the function of which is to count the number of events observed during each of the sampling periods. At the end of each period, the number in counter 40 is transferred to data register 42, and counter 40 is reset to count the events during a subsequent sampling period.

The counting by counter 40 during each period may be performed serially, or the counter may be replaced by any device or circuit, which at the end of each period supplies to data register 42 signals which represent the number of counted or observed events. The outputs of register 42 and an address counter 44 are supplied to an equality detector 45, whose output is supplied to one input of an AND gate 47, the output of which is connected the serial adder 12. Adder 12, in addition to having one output connected to two gates 14 and 15, has a carry output connected to one input of an AND gate 47, whose output is connected to the S input of a length control flip-flop 50, and to an AND gate 52. The false (F) output of flip-flop 50 is connected to the other input of AND gate 52, as well as, to another input of AND gate 14, while the true (T) output of flip-flop 50 is connected to the other input of AND gate 15, as well as, to the reset (R) input of an overflow insert flip-flop 55. The set (S) input of flip-flop 55 is connected to the output of AND gate 52 while its true (T) output is connected to a third input of OR gate 17.

The system also includes a mask flip-flop 60, two AND gates 61 and 62 and a counter 65. The output of inverter

20 is connected to the S input of flip-flop 60 as well as to one input of AND gate 62, to which the false (F) output of flip-flop 60 is also connected to another input. The output of gate 62 is connected to the address counter 44. The true (T) output of flip-flop 60 is connected to one input of gate 61 as well as to another input of AND gate 47, while another input to gate 61 is connected to receive shift pulses from the output of AND gate 27. The output of AND gate 61 is connected to the input of counter 65, whose output is in turn connected to the reset (R) input of flip-flop 60, as well as, to another input of AND gate 47.

In operation, at the end of each sampling period, the count accumulated in event counter 40 is transferred to data register 42, and counter 40 is reset to count the events during a subsequence sampling period. At the same time, a start signal is supplied to flip-flop 30, causing its T output to be true or as hereafter assumed to be at a "1" level, and thereby enable gate 27. When gate 27 is enabled, 28 counts the clock or shift pulses, supplied thereto through gate 27, from the oscillator 25. Counter 28 counts up the number of pulses, equal to the number of bits in shift register 10, and thereafter supplies a stop signal on the output thereof. This stop signal is counted by counter 32, as well as, causes flip-flop 30 to be reset and thereby disable gate 27, so that additional pulses may not be counted or supplied to the system, until a subsequent start pulse sets flip-flop 30. Since in the present example it is assumed that all the histogram data is storable in not more than 1024 bits, shift register 10 includes 1024 bits and counter 28 is assumed to provide a reset signal, each time 1024 pulses are counted therein.

The shift pulses from oscillator 25 through gate 27 are supplied to register 10, so that the bits therein may be serially readout while counter 40 is counting the events received during a succeeding period.

While counter 28 has a maximum count equal to the number of bits in register 10, the maximum count of period counter 32 is equal to the number of sampling periods of which the historgram is to be plotted, which in the present example happens to be also 1024. However, it should be pointed out again that counter 32 counts the number of sampling periods, while counter 28 counts the number of shift pulses supplied to the system by oscillator 25 during each sampling period, the number of shift pulses being equal to the number of bits in register 10.

Prior to reading out the bits of register 10, during each sampling period, the count in counter 44 which has a maximum count equal to the maximum number of events which may be received during each period is set to 0. As each code word is read out bit-by-bit from register 10 and is sensed, in a manner to be described hereafter in greater detail, the count in address counter 44 is incremented. Then, when the counter 44 equals the count in the data register 42 the quality detector 45 provides a true or "1" output, supplied to gate 47 which in turn supplies to adder 12 during the period that the true output of flip-flop 60 is also a "1." As a result, the number represented by the code word is incremented by 1. The incrementing is performed by the serial adder 12, so that its output which is supplied to AND gate 14 and therefrom through gates 17 and 19 to the input of register 10 represents the incremented code word.

If however, when a code word is readout in which the first two bits represent a number 3, as indicated by the fact that the first two bits thereof are in a "1" state, and at the same time equality detector 45 provides a "1" output, indicating that the number of the code word should be incremented to 4, a true or a "1" output is provided by adder 12 on the carry output to AND gate 47, in time coincidence with a true or a "1" output from counter 65 supplied thereto. The output of gate 47, together with the F output of FF 50 sets overflow insert flip-flop 55 through gate 52. When FF 55 is set, its T Note, however, that the same prefix code is used for each cell. This precludes the possibility of achieving the optimum, since a dynamic code based on the remaining samples only might well be superior. However, it can be shown that the best of the prefix codes is very nearly optimum.

The problems of choosing a good prefix code remains. It appears reasonable that a code for which all histograms have the same storage requirement is best. This equistorage property is achieved if the length, say $f(n)$, of the codeword assigned to the number $n$ is a linear function of $n$, that is $$f(n)=an+b$$

In this case the storage S required for the histogram $(n_1, n_2, \ldots, n_K)$ is (again observing that the Kth cell need not be sent), $$S=f(n_1)+f(n_2)+\ldots+f(n_{K-1})$$
$$=a(n_1+n_2+\ldots+n_{K-1})+b(K-1) \quad (4)$$
$$\leqq aN+b(K-1)$$

since it is always true that $$\sum_{K=1}^{K} n_k=N$$

The equality sign is achieved when $n_K=0$.

Unfortunately, diophantine restrictions preclude the realization of Eq. 4. This linear relation may be approximated by use of the following assignment, when the integers $m$ and $b$, are optimized, as shown below.

$$f(0)=f(1)=\ldots=f(m-1)=b$$

$$f(m)=f(2m+1)=\ldots f(2m1-1=b+1$$

$$f=\left(\left[\frac{N}{m}\right]m\right)=f\ldots f(N)=b+\frac{N}{m}1 \quad (5)$$

In the above expression, $[N/m]$ represents the integer part of $N/m$.

It can be seen that the maximum required storage S for $K-1$ cells is $$S=\left[\frac{N}{m}\right]1+(K-1)b \quad (6)$$

and is achieved for example, when all but one of the cells contain zero. It should be noted that the assignment $f(n)$ as a funtcion of $n$ has a "slope" equal to $1/m$.

To solve for S it is necessary to select the integers $m$ and $b$ such that two conditions are met: (1) The code is relizable, and (2) S is minimized. It can be shown mathematically that, the integers $m$ and $b$ which meet these conditions are such that $m=2^{b-1}$ and $b$ is one of the closest integers to $b_0$, where $$b_0=\log_2\frac{N}{K-1}+1-\log_2\log_2 e \quad (7)$$

or $$b_0=\log_2\frac{N}{K-1}+0.47 \quad (8)$$

Since $b_0$ is not generally an integer, it is necessary to round up or down to obtain an integer, the choice depending upon the resulting values of S. The concavity of $[N/M+(K-1)b]$ guarantees that one of the two choices is optimum. The concavity also guarantees that an upper bound to S is achieved by substituting $b=b_0+1$ in an upper bound to Equation 6. Namely, $$S\leq\frac{N}{m}+(K-1)b \quad (9)$$

The result is that, $$S\leq(K-1)\left(\log_2\frac{N}{K-1}+2.2\right) \quad (10)$$

By comparing Equation 3, which expresses the minimum approximated storage required for an (N, K) histogram, as S**, with the value of S in Equation 10. It is seen that the prefix code described herein has a storage requirement which differs from the minimum, by approximately $(K-1)(2.2-\log_2 e)$ or ¾ K bits. The increased storage requirement is justified because the code could be generated with simple circuits and therefore lend themselves to simple implementation.

In the foregoing example where $N=1024$ and $$K-1=256$$

$$b_0=\log_2\frac{1024}{256}+0.47=2.47$$

When $b$ is selected as 2, $m=2$ while when $b=3$, $m=4$. The actual value of $b$ and $m$ are determined by solving Equation 6 for both cases and selecting the values for $b$ and $m$ in which S is a minimum. In this example, $b=2$ and $b=3$ both give $S=1024$. Considering the case with $b=3$ and $m=4$, the lengths of the codewords may be expressed as $$f(0)=f(1)=\cdots\cdots\cdots=f(3)=3$$

$$f(4)=f(5)=\cdots\cdots\cdots=f(7)=3+1=4$$

$$f(8)=f(9)=\cdots\cdots\cdots=f(11)=3+2=5$$

$$f(1020)=f(1021)=f(1022)=f(1023)=3+255=258$$

$$f\left(\left[\frac{1024}{4}\right]4\right)=3+256=259 \quad (11)$$

That is, the smallest length of a codeword is 3, while the longest possible codeword may be 259. However, the maximum length is $$S=\left[\frac{1024}{4}\right]+(256)3=256+768=1024$$

Thus, in accordance with the teaching disclosed herein, only 1024 bits are required as compared with the 1280 required by the prior art system, for storing the same histogram data.

In accordance with one implementation of the teaching of the invention when $b$ is 3, each codeword includes at least 3 bits. $b-1$ of the bits, i.e., 2, are used for binary notation while the last bit is used as a marker bit. The marker bit is always in a "0" state, or a "0" bit. When the codeword is to represent a number greater than 3, its length is increased, with an overflow bit in a "1" state, inserted between the first two bits and the marker bit for each value of 4 (i.e., $m$) not represented in the first two bits. Such a code word representation is diagrammed in chart form in FIGURE 3 to which reference is made herein. As seen from FIGURE 3 the number 0 is represented by three "0" bits, the first two, indicating the number in binary code and the last serving as the marker. The number 3 is represented by the first two bits in "1" state or "1" bits, followed by a "0" marker. However, when the number is greater than 3, an overflow bit in a "1" state is inserted between the first two binary bits and the marker bit, at the end of each codeword.

To use the codewords to store the histogram data as diagrammed in FIGURE 2($b$), a shift register or delay line of 1024 bits is used. Initially, all bits are set to a "0" state. The first three bits, forming codeword W0 are associated with the 0 events per period, etc. Initially, since each codeword is of three bits and the number of codewords is 256, only the first 768 bits are of significance. The other bits may be regarded as insignificant bits.

At the end of each sampling period (1 second), the number of events observed or counted, is transferred to a data register and the bits of the shift register are readout. When the codeword associated with the number of observed or counted events, is readout the codeword is incremented by one.

At the end of a subsequent period, the number of events counted is again transferred to the data register to increment by one the codeword associated with the paroutput is true, so that a "1" is inserted, through OR gate 17 and AND gate 19 into the stream of bits, supplied to the input of shift register 10. Because of the additional bit, the rest of the bits readout from the shift register 10 have to be supplied back to the register's input, delayed by one bit period. This delay is achieved by using the true output of gate 47 to set FF 50. As a result, its T output is true, disabling gate 14 and enabling gate 15, so that the bits from adder 12 are routed to the input of register 10 through gate 15, delay unit 21, OR gate 17 and AND gate 19. Also, to insure that only single extra bit is inserted, after FF 50 is set to true, during the subsequent clock period, FF 55 is reset, which results in a "0" or false level at its T output.

Figure 5:
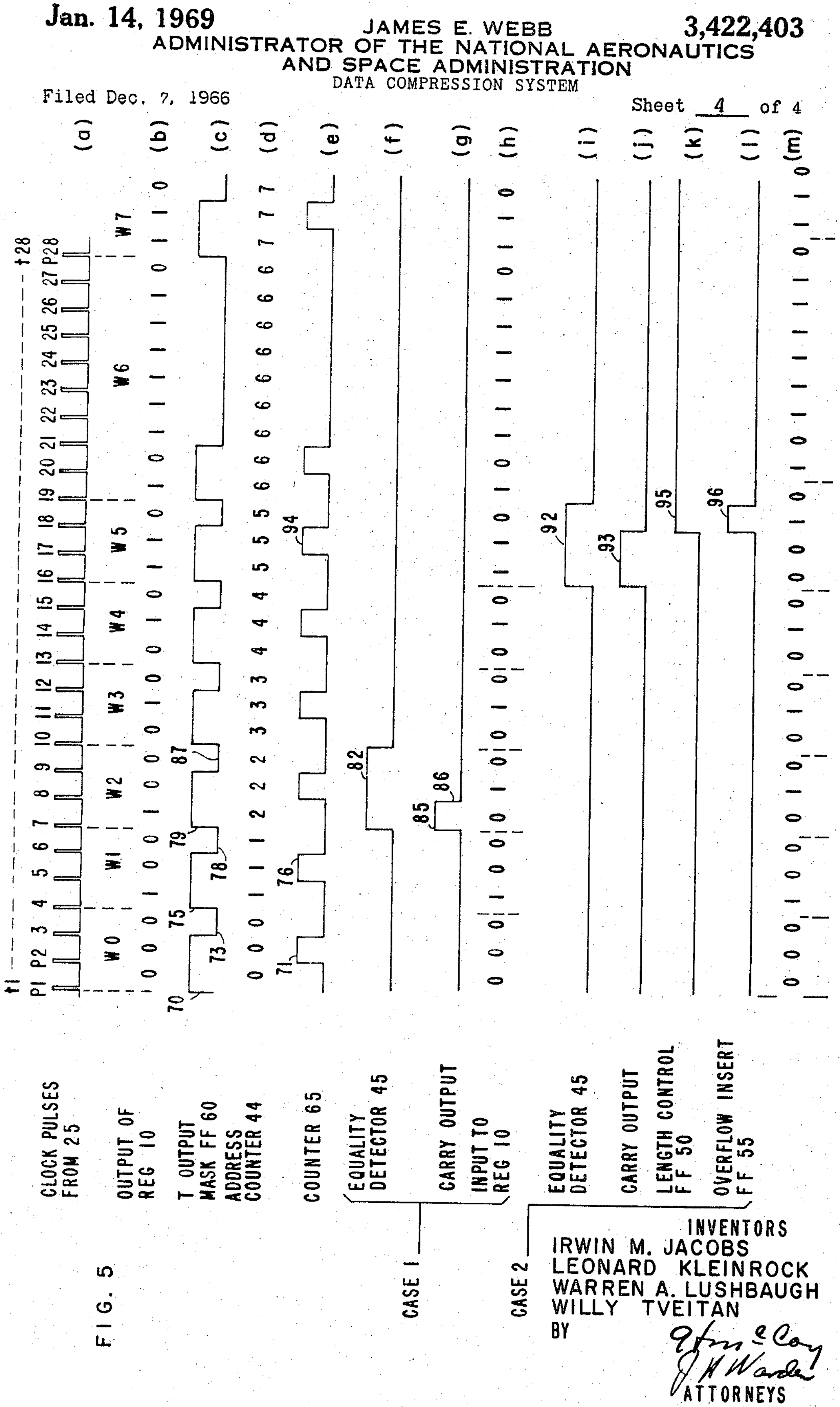
FIGURE 5 is a diagram of waveforms, useful in explaining FIGURE 4.

Reference is now made to FIGURE 5 which is a waveform type diagram, useful in explaining two specific examples from which the operation of the circuitry of FIGURE 4, may better be understood. Line *a* of FIGURE 5 represents a sequence of clock pulses, designated P1–P28 assumed to be supplied from oscillator 25, at times *t*1–*t*28, while line *b* represents a sequence of bits, starting from the left-hand side which, represents 8 code words designated W0–W7. W0–W7 of FIGURE 5 are not the same as those in FIGURE 2(*a*). From the foregoing description of the code, it should be appreciated, that the number represented by code word W0 is 0, while the numbers represented by code words W6 and W7 are 25 and 3 respectively. Line *c* represents the T output of mask flip-flop 60, while the numbers in line *d* represent the count in the address counter 44. The output of counter 65 is represented in line *e*. For the first diagrammed case, it is assumed that event counter 40 counted 2 events, during a sampling period and transferred such data to the data register 42. The function of the system now is to store the fact, that 2 events were observed during a period, in the appropriate code word.

It should be recalled that since the first code word W0 in the sequence represents 0 events per second, it is the third code word W2 which is associated with the count of 2 events-per-period. Thus, with the count in data register 42 being 2, a start signal is supplied to flip-flop 30 to start the reading out of the bits from shift register 10, so that the code word W2 could be incremented by 1. Before the start of the operation, the count in counter 44 is 0 as indicated in line *d*. At the start of the operation at *t*1, FF 60 is set, as indicated by numeral 70. As a result, gate 62 is disabled, so that the count in counter 44 cannot increase, regardless of whether a "0" or a "1" are readout from register 10. Thus, clock pulse P1, which shifts the first bit out of the shift register 10, does not effect the status of the various circuits. The setting of FF 60 at the start of the reading operation may be achieved by connecting the S input of FF 60 to a start line (not shown), so that F 60 may be set either when the output of inverter 20 is a "1" or when a start signal is supplied, in time coincidence with a clock pulse, such as P1.

When clock pulse P2 is received and the T output of flip-flop 60 is true, gate 61 is enabled. As a result, the output of counter 65 is set to true as indicated by numeral 71, resulting in a true level at the R input of flip-flop 60. Then when the next clock pulse P3 is received, flip-flop 60 is reset as indicated by the false level of its T output designated, in line *c* of FIGURE 5, by numeral 73.

From FIGURE 5, it is thus seen that during the interval between pulses P3 and P4 the mask flip-flop is reset so that its F output is true, i.e. at a "1" level. Also, at the same time, because of the "0" bit representing the marker bit of word W0, the output of inverter 20 is a "1," so that both inputs to AND gate 62 are 1's, and therefore the gate is enabled. As a result, when the next clock pulse, i.e. P4, is received, the count in counter 44 is incremented to 1 as indicated in line *d*. Also at the same time, since the output of inverter 20 is a "1," when pulse P4 arrives flip-flop 60 is set as indicated by numeral 75 in line *c*. During the next two bit intervals, i.e. when the next two bits of the next code word W1 are readout, the mask flip-flop 60 remains set irrespective of whether the bits readout are "0's" or "1's." As seen from line *b* of FIGURE 5, the first two bits of code word W1 are "1" and "0" respectively, neither one affecting the set state of flip-flop 60 nor the count in counter 44. After pulse P4 is received and the count in the counter 44 is 1, the output of the equality detector 45 still remains a "0" since the content of data register 42 is assumed to be the number 2.

As seen from FIGURE 4 and line *e* of FIGURE 5, when pulse P5 arrives, AND gate 61 is enabled, to set counter 65 as indicated by numerals 76 in line *e*. Then, the subsequent pulse P6 again causes AND gate 61 to increment the counter 65, resulting in the resetting of the counter. Also, when P6 arrives FF 60 is reset as indicated, in line *c* of FIGURE 5, by numeral 78. When the next pulse P7 arrives, flip-flop 60 is again set as indicated by numeral 79 while the count in counter 44 is augmented to 2, matching the content in the data register 42. As a result, the output of equality detector 45 is true, as indicated by numeral 82 in line *f*. Thus, between pulse P7 and P8 the output of equality detector 45 is a "1." And, since at the same time the T output of flip-flop 60 is also true or a "1" since during that period mask flip-flop 60 is set to true, a "1" output is supplied by AND gate 47 to serial adder 12.

If during the same time the bit from register 10 is a "0," a "1" is supplied as the output of serial adder 12. However, if as shown in line *b* of FIGURE 5 the output of the serial register 10 is a "1," as indicated by the first bit of word W2, a true or a "1" carry signal from serial adder is provided on the carry line to the AND gate 47, as indicated in line *g* of FIGURE 5 by numeral 85. At the same time the serial adder in response to the "1" from AND gate 47 and the "1" from register 10 provides a "0" bit output therefrom, and carries the "1" for insertion in the subsequent bit supplied thereto from the shift register 10 in a manner, well known in the art of serial adders.

Referring to line *a* of FIGURE 5 which represents the series of bits supplied to the shift register 10 after th code word W2 is incremented by 1, it is seen that the first bit of code word W2 is a "0" while the subsequent bit is a "1," though the original second bit of codeword W2 was a "0" as indicated in line *b* of FIGURE 5. When pulse P8 arrives, and the carrying operation within serial adder 12 has been completed, the carry output of the adder is again false supplying a "0" signal to AND gate 47, as indicated by the negative trailing edge designated by numeral 86. Pulse P8 also actuates AND gate 61 which sets the output of counter 65 so that when pulse P9 arrives, the flip-flop 60 is again reset as indicated by numeral 87 in line *c*, and remains reset until the coincidence of a "1" output from inverter 20 which occurs whenever a "0" output is provided by serial adder 12, and a clock pulse, such as P10. Also, such coincidence of pulses is necessary to increment the count in counter 44. Once the count in counter 44 is incremental by 1 to 3, when the beginning of the next codeword is readout, the count in counter 44 will always be greater than the number in data register 42 which is 2. As a result, the output of the equality detector 45 will always be false or a "0," thereby supplying through AND gate 47 a "0" to adder 12. Consequently, the exact bit readout from serial adder 12 will be supplied to the input of register 10, through AND gate 14, OR gate 17, and AND gate 19.

From the foregoing, the operation of the circuit shown in FIGURE 4 may be summarized as follows. After the first two bits of a codeword are received, the counter 65 and FF 60 are reset. Then, when the last bit of the code, i.e. the "0" marker is received, the output of inverter 20 and thereby the S input of flip-flop 60 are a "1." Thus, when the next clock pulse is received, flip-flop 60 is set to true, and remains true for two bit periods, during which the first two binary bits of the code word are readout. If during such time the count in counter 44 equals that in data register 42, the equality detector 45 provides a true or "1" output which is used by the serial adder 12 to increment the binary count in the first two bits. In the foregoing example, the number one (1) was incremented to two (2) by setting the first bit of word W2 to a "0" state and the second bit to a "1," as indicated in line *h* of FIGURE 5.

Attention is again directed to FIGURE 5 and in particular to lines *h* through *m* thereof in conjunction with which, the operation of the system shown in FIGURE 4 for inserting a "1" bit between the first two bits of a code word and the marker bit will be explained. For this explanation, it is assumed that the event counter 40 (FIGURE 4) transferred at the end of a sampling period a number five (5) to the data register 42, so that the system has to increment the number of code word W5 by one (1). As seen from line *h* in FIGURE 5, the codeword W5 stores the number three (3) as indicated by the fact that the first two bits of word W5 are "1's." From the foregoing description, it should be appreciated that when pulse P16 is received, the count in counter 44 is incremented by one (1) to a count of five (5) as indicated in line *d*. Since the count in data register 42 is also assumed to be five (5), the equality detector 45 provides a true or "1" output, as indicated by numeral 92 in line *i* of FIGURE 5. Since at the same time the output of register 10 to serial adder 12 is a "1," a true or "1" carry output is supplied to AND gate 47 as indicated by numeral 93 in line *j*.

The output of serial adder 12 at the same time becomes a "0" as indicated in line *m* by the first bit of code word W5. Then, during the next bit interval when the next bit of code word W5 is read out from register 10, and since the second bit is "1," the CARRY output remains true, during the interval between pulses P17 and P18. However, since during the same interval, the output of counter 65 is true, as indicated in line *e* by numeral 94, both inputs to AND gate 47 are true. Thus, the S input of flip-flop 50 is true or a "1," so that when the next clock pulse, i.e. pulse P18 is received, the flip-flop is set so that its T output is true, as indicated by numeral 95 in line *k* of FIGURE 5. The output of AND gate 47 is also supplied to AND gate 52 so that when pulse P18 is received overflow insert flip-flop 55 is also set so that its T output is true, as indicated by numeral 96 in line 1 of FIGURE 5. When flip-flop 55 is set to true, a "1" signal is supplied to one of the inputs of OR gate 17 so that "1" is stored in register 10 as indicated in line *m* of FIGURE 5. The "1" is the third bit of code word W5.

It should be pointed out that when flip-flop 50 is set to true, at the instant that clock pulse P18 is received, its F output becomes false or "0," thereby disabling AND gate 14. Similarly, the setting of flip-flop 50 to true enables gate 15 so that, thereafter the output bits from serial adder 12 are routed through AND gate 15 and delay unit 21, and therefrom through OR gate 17 and AND gate 19 to the input of register 10. That is, delay unit 21 provides a delay of one bit interval, necessary to delay each of the bits to be received from shift register 10 through serial adder 12, due to the insertion of the "1" by the overflow insert flip-flop 55. During the next pulse P19, the overflow insert flip-flop 55 is reset since the R input thereof is connected to the true output of set flip-flop 50. The flip-flop 50 will remain set for the rest of the reading out of the data register 10, so that each bit read out from the register is routed through the delay unit 21. Then, at the end of reading out the shift register, a stop signal is supplied to flip-flop 50 resetting it for a subsequent reading operation.

There has accordingly been shown and described herein a novel data compression system for recording and storing histogram data in an optimum minimal number of storage bits. The system is based on the use of a serial type memory, such as a shift register, for storing the data. The length of the shift register is minimized by assuming that the bits thereof represent code words, the location of each one of which is associated with another cell of the histogram, and the number thereof represents the height or number of sampling periods included in each cell. Heretofore, the invention has been described in conjunction with histogram data gathered during each of 1024 sampling periods, during each one of which up to 255 events were counted. Thus, a shift register necessary for storing such data includes enough bits to define 256 code words, with the first code word being associated with zero (0) events-per-period, while the last one is associated with a count of 255 events-per-period. The number represented by each code word represents the number of periods, during each of which the number of events-per-period with which the word is associated have been counted. In the foregoing, theory for establishing absolute minimal number of storage elements is discussed, as well as, the theory and implementation of a practical code word, which though not resulting in a minimal number of storage elements is a close optimum thereof.

Briefly summarized, knowing the number of samples (N) and the number of cells ($K-1$) of the histogram, Equation 8 is solved to determine $b_0$. From it $b$ is determined. The term $b$ is the closest integer which is either greater or smaller than $b_0$. Which value is chosen for $b$ is determined by solving Equation 6 for a minimum value of S. It should be recalled that, $m=2^{b-1}$. Once $b$ is determined it represents the minimum number of bits of each code word. One bit is used as the marker bit and $b-1$ bits as the binary bits. The actual length of each code word at the end of the storing operation is a function of the number which it represents. The actual length of a code word as a function of the number represented thereby is given by expression (5).

It is appreciated that those familiar with the art may make modifications and/or substitute equivalents for the arrangements as shown without departing from the spirit of the invention. Therefore, all such modifications and/or equivalents are deemed to fall within the scope of the invention as claimed in the appended claims.

What is claimed is:

1. A system for storing data representing the number of events occurring during each of N observation periods, the maximum number of events which may occur during any one period being $K-2$, the system comprising:

a serial memory comprising of a sequence of storage elements, defining a sequence of $K-1$ number-representing code words, the location of each code word in said sequence being related to a particular number of elements, observable during any one period;

first means for controlling said serial memory so that each of the code words represents the number zero; and control means coupled to said memory for controlling said serial memory at the end of each observation period to increment by one the number represented by a code word related to the number of observed events during the preceding observation period, whereby at the end of said N observation periods, the number represented by each code word represents the number of periods during each one of which, a number of events related to the code word, were observed.

2. The system defined in claim 1 wherein said serial memory is a serial shift register of S bits, each bit having a first "0" binary state and a second "1" binary state, each code word comprising of a plurality of bits including a marker bit, said control means including means responsive to each marker bit for distinguishing between successive code words in said sequence.

3. The system defined in claim 2 wherein the length of each code word as a function of the number represented thereby, is definable by $$f(0)=f(1)= \ldots\ldots =f(m-1)=b$$
$$f(m)=f(m+1)= \ldots\ldots =f(2m-1)=b+1$$
$$f\left(\left[\frac{N}{m}\right]m\right)= \cdots\cdots =f(N)=b+\left[\frac{N}{m}\right]1$$

where N is the largest number, $m=2^{b-1}$ and $b$ is the closest integer selected to be either greater than or smaller than $b_0$, where $$b_0=\log_2 \frac{N}{K-1}+0.47$$

4. The system defined in claim 3 wherein one of the bits of each code word defines said marker bit.

5. The system defined in claim 4 wherein said first means include means for setting all the bits in said shift register to their "0" states whereby each $b$ bit in said sequence represents a code word representing the number zero, the last bit representing said marker bit and the first $b$–1 bits in their "0" states representing the number zero in binary notation.

6. The system defined in claim 5 wherein said control means include means for sensing, within said sequence, the code word to be incremented by one, as a function of the number of events observed during an observation period, said control means including serial adder means for controlling the binary states of the $b$–1 bits of the sensed code word so that the number represented thereby is incremented by one, up to a maximum of $m$–1, said serial adder setting said $b$–1 bits to their "0" states and providing a carry signal of a selected duration when the number represented by the first $b$–1 bits of the sensed code word is $m$–1 and the sensed code is to be incremented by one, said control means including bit-inserting means to which said carry signal is supplied for inserting a "1" bit after said $b$–1 bits, said "1" bit representing a value, equal to $m$.

7. A system for storing data for use in plotting an N sample, K cell histogram, N representing sampling periods and each cell representing a particular number of events observed during each period, including zero event per period, comprising:

a memory of S storage bits, each having a "0" state and a "1" state;

first control means for setting at least the first $(k-1)b$ bits of said S bits to said "0" state, $b$ being the closest integer which is either greater or smaller than $b_0$, where $$b_0=\log_2 \left(\frac{N}{K-1}\right)+0.47$$

each $b$ bits defining a code word, each code word being associated with a different number of events observable in one sampling period;

second control means connected to said memory and responsive to a start-read signal at the end of each sampling period for reading out said code words, from said memory; and third control means responsive at the end of a sampling period to the number of observed events during said sampling period and coupled to said memory for incrementing by one the numerical value represented by the code word associated with the number of events observed during said period, so that at the end of N periods the numerical value represented by each code word is the number of sampling periods, during each one a number of events equaling the number of events per period associated with the code word have been observed, the length of each code word as a function of the numerical value represented thereby being defined by $$f(0)=f(1)= \ldots\ldots =f(m-1)=b$$
$$f(m)=f(m+1)= \ldots\ldots =f(2m-1)=b+1$$
$$f\left(\left[\frac{N}{m}\right]m\right)= \cdots\cdots =f(N)=b+\left[\frac{N}{m}\right]$$

where $m=2^{b-1}$ and $[N/m]$ is the integer value of $N/m$.

8. The system defined in claim 7 wherein said memory comprises a serial shift register of S bits, S being equal to $$\left[\frac{N}{m}\right]+(K-1)b$$

said code words being arranged in said register in a sequence.

9. The system defined in claim 8 wherein each of said code words includes a marker bit in the "0" state at the end thereof to indicate the end of a code word, and said third control means includes means for sensing said marker bits to sense each code word read out from said memory, so as to increment by one the numerical value of the code word, associated with the number of events per period which equals the number of observed events supplied thereto.

References Cited

UNITED STATES PATENTS

| | | | |
|---|---|---|---|
| 3,206,747 | 9/1965 | Casper | 343—7 |
| 3,273,130 | 9/1966 | Baskin et al. | 340—172.5 |
| 3,310,786 | 3/1967 | Rinaldi et al. | 340—172.5 |

OTHER REFERENCES

R. W. Bemer: Data Compression System, IBM Technical Disclosure Bulletin, vol. 3, No. 8, January 1961.

PAUL J. HENON, *Primary Examiner.*

I. S. KAVRUKOV, *Assistant Examiner.*